United States Patent
Bui et al.

(10) Patent No.: US 12,131,761 B2
(45) Date of Patent: *Oct. 29, 2024

(54) SERVO PATTERN FOR SKEW BASED TAPE DIMENSIONAL STABILITY COMPENSATION

(71) Applicant: International Business Machines Corporation, Armonk, NY (US)

(72) Inventors: Nhan Xuan Bui, Tucson, AZ (US); Mark Alfred Lantz, Adliswil (CH); Simeon Furrer, Altdorf (CH); Robert Biskeborn, Hollister, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/299,449

(22) Filed: Apr. 12, 2023

(65) Prior Publication Data
US 2023/0253011 A1    Aug. 10, 2023

Related U.S. Application Data

(63) Continuation of application No. 17/060,671, filed on Oct. 1, 2020, now Pat. No. 11,682,423.

(51) Int. Cl.
*G11B 20/12*    (2006.01)
*G11B 5/584*    (2006.01)

(52) U.S. Cl.
CPC .................................. *G11B 5/584* (2013.01)

(58) Field of Classification Search
None
See application file for complete search history.

(56) References Cited

U.S. PATENT DOCUMENTS

| 5,689,384 | A | 11/1997 | Albrecht et al. |
| 6,141,174 | A | 10/2000 | Judge et al. |
| 6,842,305 | B2 | 1/2005 | Molstad et al. |
| 6,898,045 | B2 | 5/2005 | Beck et al. |
| 7,881,008 | B2 | 2/2011 | Cherubini et al. |
| 8,000,056 | B2 | 8/2011 | Bates |
| 8,760,795 | B2 | 6/2014 | Cherubini et al. |
| 9,275,666 | B1 | 3/2016 | Vanderheyden et al. |
| 9,633,681 | B1 | 4/2017 | Cherubini et al. |
| 9,997,184 | B1* | 6/2018 | Bui ..................... G11B 5/5926 |
| 11,682,423 | B2* | 6/2023 | Bui ..................... G11B 21/086 360/77.12 |

(Continued)

FOREIGN PATENT DOCUMENTS

WO    20041025382 W    11/2004

OTHER PUBLICATIONS

Barrett R C et al: "Timing-Based Track-Following Servo for Linear Tape Systems" Jul. 1, 1998 XP000833231.

(Continued)

*Primary Examiner* — Peter Vincent Agustin
(74) *Attorney, Agent, or Firm* — KONRAD, RAYNES, DAVDA & VICTOR LLP; Rabindranath Dutta

(57) ABSTRACT

In response to a rotation of timing-based servo (TBS) patterns of a first servo band and a second servo band, heights of top and bottom portions of servo stripes of servo frames of the TBS patterns are adjusted to compensate for changes in a usable height of the servo stripes caused by the rotation.

25 Claims, 10 Drawing Sheets

(56) References Cited

U.S. PATENT DOCUMENTS

| | | | |
|---|---|---|---|
| 2006/0103968 A1 | 5/2006 | Jurneke | |
| 2007/0097537 A1* | 5/2007 | Hoerger | G11B 5/584 |
| 2008/0144211 A1 | 6/2008 | Weber et al. | |
| 2009/0040643 A1 | 2/2009 | Weng et al. | |
| 2009/0213489 A1* | 8/2009 | Bui | G11B 5/584 |
| | | | 360/77.12 |
| 2009/0219648 A1* | 9/2009 | Jaquette | G11B 5/584 |
| | | | 360/77.12 |
| 2009/0316296 A1* | 12/2009 | Cherubini | G11B 5/596 |
| 2009/0316773 A1* | 12/2009 | Cideciyan | G11B 5/584 |
| | | | 375/239 |
| 2015/0043101 A1* | 2/2015 | Biskeborn | G11B 5/4893 |
| | | | 360/71 |
| 2015/0043101 A1 | 2/2015 | Biskeborn et al. | |
| 2022/0108718 A1* | 4/2022 | Bui | G11B 5/584 |
| 2023/0253011 A1* | 8/2023 | Bui | G11B 5/584 |
| | | | 360/77.12 |

OTHER PUBLICATIONS

International Search Report and Written Opinion for International Application No. PCT/EP2021/076039, Jan. 3, 2022, 11 pp. [18.930PCT (ISR & WO)].

U.S. Appl. No. 17/060,671, filed Oct. 1, 2020, (18.930).

Office Action dated Jul. 23, 2021, 10pp., for U.S. Appl. No. 17/060,671, (18.930).

Response dated Oct. 25, 2021, 11pp., to Office Action, 10pp., for U.S. Appl. No. 17/060,671, (18.930).

Notice of Allowance dated Nov. 10, 2021, 5pp., for U.S. Appl. No. 17/060,671, (18.930).

Office Action dated Jan. 26, 2022, 8pp., for U.S. Appl. No. 17/060,671, (18.930).

Response dated Apr. 26, 2022, 11pp., to Office Action, 8pp., for U.S. Appl. No. 17/060,671, (18.930).

Final Office Action dated May 10, 2022, 9pp., for U.S. Appl. No. 17/060,671, (18.930).

Response dated Aug. 10, 2022, 13pp., Final Office Action, 9pp., for U.S. Appl. No. 17/060,671, (18.930).

Office Action dated Aug. 19, 2022, 6pp., for U.S. Appl. No. 17/060,671, (18.930).

Response dated Nov. 21, 2022, 14pp., to Office Action, 6pp., for U.S. Appl. No. 17/060,671, (18.930).

Notice of Allowance dated Dec. 26, 2022, 5pp., for U.S. Appl. No. 17/060,671, (18.930).

Notice of Allowance dated Mar. 6, 2023, 9 pp. for U.S. Appl. No. 17/060,671, (18.930).

List of Patents or Patent Applications Treated as Related, 2 pp., dated Apr. 12, 2023.

* cited by examiner

SERVO PATTERN FOR SKEW BASED TAPE DIMENSIONAL STABILITY COMPENSATION

CROSS-REFERENCE TO RELATED APPLICATION

This application is a continuation of U.S. patent application Ser. No. 17/060,671, filed Oct. 1, 2020, which application is incorporated herein by reference in its entirety.

BACKGROUND

The disclosure relates to tape storage systems, and more specifically relate to a servo pattern for skew based tape dimensional stability compensation.

In magnetic media, data is typically stored as magnetic transitions, e.g., data is magnetically recorded on a surface of the magnetic media. The data stored is typically arranged in data tracks. A typical magnetic storage medium, such as a magnetic tape, includes a plurality of data tracks. Transducer (read/write) heads are positioned relative to the data tracks to read/write data along the tracks. Accordingly, a tape drive head locates each data track and accurately follows the path of the data track. To achieve this, servo techniques have been developed which allow for a precise positioning of the head relative to the data tracks. One such technique makes use of servo patterns, that is, patterns of signals or recorded marks on the medium, which are tracked by the head. The servo patterns are recorded on the tape in order to provide a position reference for the data tracks. In other words, a servo head reads a servo pattern, which is then interpreted by a servo controller into a position error signal (PES). The PES is then used to adjust the distance of the servo head relative to the servo pattern and ensure a proper positioning of the transducers with respect to the set of data tracks.

In a magnetic tape medium, the servo patterns are stored on dedicated tracks (called servo bands). A plurality of patterns may be defined within a servo band and a plurality of servo bands may be relied upon by processes that read and write data on a tape. The data tracks are arranged between the servo bands. A particular servo technique uses a timing-based servo (TBS) pattern, which makes use of non-parallel marks, to which time or distance variables may be associated. In TBS systems, recorded servo patterns include transitions with two different azimuthal slopes. An estimate of the head lateral position is derived from the relative timing of pulses generated by a servo reader reading the servo pattern. In a TBS format, the servo patterns are prerecorded in several bands distributed across the tape, where the bands on which the servo patterns are prerecorded are referred to as servo bands. Data is recorded in data tracks in the regions located between pairs of servo bands.

Tape Dimensional Stability (TDS) is a measure of the positional stability of the data tracks relative to each other and is a function of the tape properties and environmental effects such as temperature, humidity, tension, creep, etc. These environmental factors may cause the tape to expand or contract laterally, across the width of the tape. Therefore, when a tape is written to in one environmental condition and subsequently read from in another environmental condition, the position of the data tracks across the tape width may change enough to cause signal degradation or read errors.

SUMMARY OF THE PREFERRED EMBODIMENTS

Provided are a method, a tape formatting device, a computer program product, a tape, and a servo write head in which in response to a rotation of timing-based servo (TBS) patterns of a first servo band and a second servo band, heights of top and bottom portions of servo stripes of servo frames of the TBS patterns are adjusted to compensate for changes in a usable height of the servo stripes caused by the rotation.

In certain additional embodiments the TBS patterns are adjusted to compensate for an angular displacement between equivalent servo frames of the first servo band and the second servo band.

In further embodiments, the first servo band and the second servo band are two successive servo bands included in a plurality of servo bands.

BRIEF DESCRIPTION OF THE DRAWINGS

Referring now to the drawings in which like reference numbers represent corresponding parts throughout.

DETAILED DESCRIPTION

Figure 1:
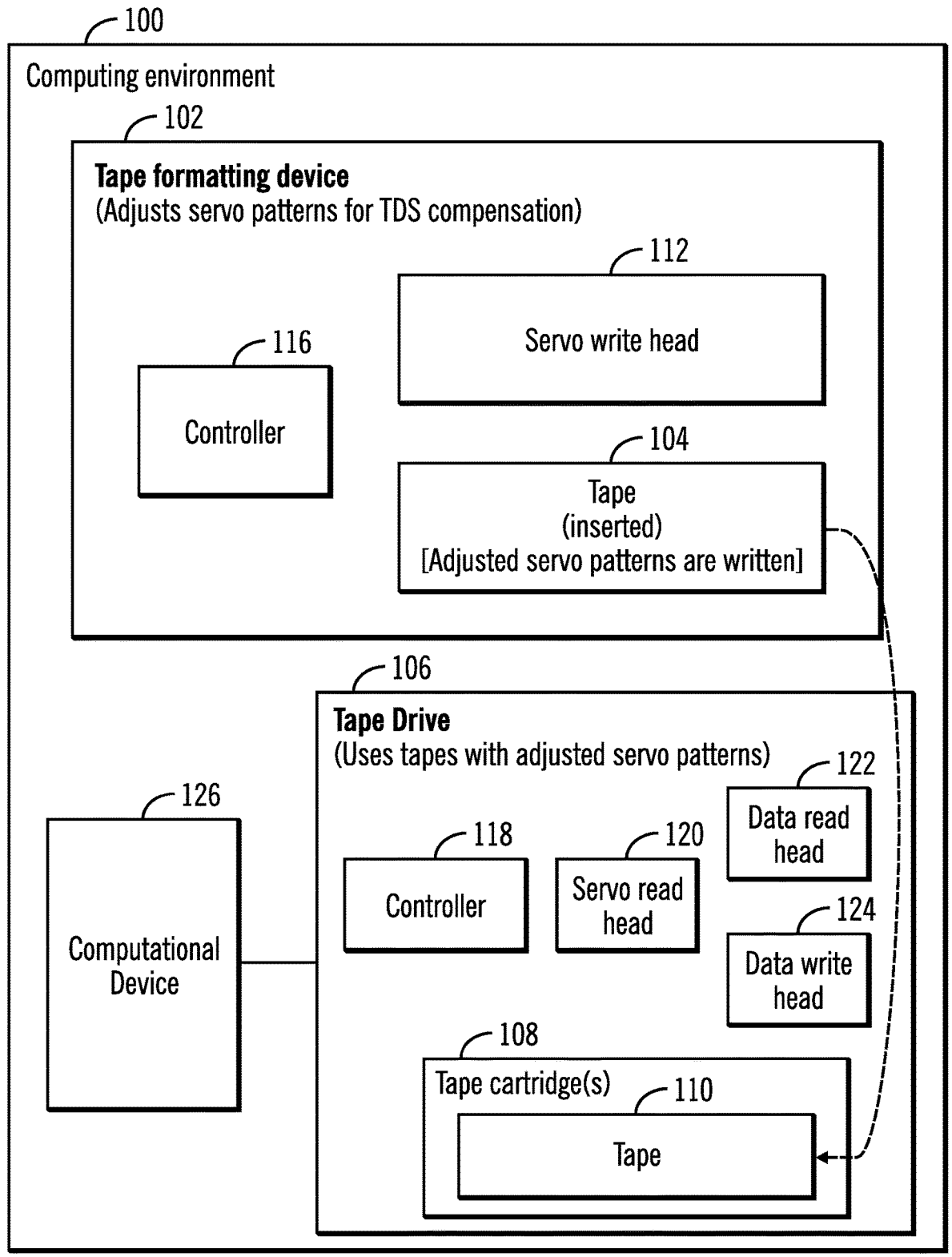
FIG. 1 illustrates a block diagram of a computing environment comprising a tape formatting device that writes servo patterns on a tape for TDS compensation, and the use of the tape in a tape drive, in accordance with certain embodiments.

In the following description, reference is made to the accompanying drawings which form a part hereof and which illustrate several embodiments. It is understood that other embodiments may be utilized and structural and operational changes may be made.

Tape drives may use active skew control to enable read while write verification that helps to ensure reliability and active TDS control to enable higher track density and hence increased capacity. Both TDS and skew are measured using a pair of servo readers. The two servo readers are positioned at opposite ends of the array of read and write transducers and read two TBS patterns that bracket each data band during operation of the tape drive.

The TBS servo pattern includes groups of stripes written on the magnetic tape at an azimuth angle of +α and −α. As the servo reader reads the servo pattern during tape transport, it produces a series of 'dibit' pulses in response to each stripe, resulting in bursts of dibit pulses in a repeating 5-5-4-4 pattern. The relative timing of these dibit (also referred to as di-bit) pulses are analyzed by a servo channel to produce a series of measurements of the lateral position of the tape relative to the head referred to as YPOS. The skew of the tape relative to the head is measured by comparing the distance travelled between the arrival of a dibit pulse observed with the top servo reader from a given stripe in the servo pattern and the pulse from the corresponding stripe observed with the bottom servo reader. This technique is known as top-bottom skew.

TDS is measured by calculating the difference between the YPOS value measured with the top servo reader and YPOS value measured by the bottom servo reader [a value referred to as servo band difference (SBD)]. An increase in SBD corresponds to a decrease in the width of the tape.

Changes in the width of the tape that result from changes in temperature, humidity and tension as well as to long term creep effects are referred to as TDS. Changes in TDS or tape width are measured by changes in SBD and may be actively compensated. In certain mechanisms, tape tension is used for active TDS compensation. However, this approach is limited in range and introduces additional problems (e.g., longer cycle times due to low tension unload, tape cinch, increased risk of tape breakage, variable tape head friction, variable tape head spacing, etc.).

Certain mechanisms may provide a skew-based TDS compensation. In such mechanism the tape drive is operated with a head that has a nominal rotation angle (beta) relative to the tape, where beta is on the order 1-10 degrees. The effective span of the head may then be increased or decreased by decreasing or increasing the rotation angle. Larger angles provide more TDS compensation gain, however as discussed below they introduce problems in the performance of the servo channel.

In current tape drives that do not implement skew-based TDS compensation, the absolute value of the angle of the servo stripes relative to the servo reader is constant. As a result, the dibits produced by the servo reader reading stripes with a positive angle is the same as that from stripes with a negative angle. However, if the head is rotated clockwise by an angle beta (β) relative to the tape, the relative angle of the servo reader to a first set of stripes will be (α−β) and for the second set of stripes it will be (α+β). For example, for α=12 degrees and β=10 degrees, the relative angles are 2 and 22 degrees.

Certain embodiments include operations to rotate the servo pattern (e.g. by rotating servo head during servo formatting, or rotating the position of the write gaps on the servo format head) by an angle equal to (or almost equal to) the nominal angle of rotation, beta (β), of the tape drive head. This solves most of the issues described above but reduces the useable height of the servo pattern, i.e., the range of YPOS that can be measured. To address this, this disclosure provides a set of rules to adapt the geometry of the servo pattern to increase the range of measurement. Finally, certain embodiments provide additional modifications to the servo pattern to reduce residual distortions not fully compensated by rotating the servo pattern.

FIG. 1 illustrates a block diagram of a computing environment 100 comprising a tape formatting device 102 that writes servo patterns on a tape 104 for TDS compensation, and the use of the tape 104 in a tape drive 106, in accordance with certain embodiments. The tape formatting device 102 writes adjusted patterns using a servo write head that has been manufactured as per embodiments provided in this disclosure. It should be noted that the adjustments need to be made to the servo write head during manufacturing of the servo write head. Specifically, the adjustments of the servo write head may need the modifying of the geometry of the physical write gaps in the servo write head relative to the write gaps of the servo write head used for writing conventional TBS patterns. The tape 104 when included in a tape cartridge 108 of the tape drive 106 is referred to via reference numeral 110.

The tape formatting device 102 writes adjusted servo patterns for TDS compensation on the tape 104, where the servo patterns are written by the servo write head 112. A controller 116 included in the tape formatting device 102 controls the movements of the tape 104 and the writing of servo patterns on the tape 104. The controller 116 of the tape formatting device 102 controls the tape speed and the write current pulses applied to the servo write head 112 in order to write the servo stripes (i.e., the servo pattern). The position of the servo write head 112 is fixed during servo formatting.

The tape drive 106 that uses tapes with adjusted servo patterns includes a controller 118 that controls the operations of a servo read head 120, a data read head 122, and a data write head 124. The tape 104 with the adjusted servo patterns is inserted in the tape cartridge 108 of the tape drive 106 and shown via reference numeral 110. The controller 118 of the tape drive 106 uses the servo read head 120 to read the adjusted servo patterns written on the tape 110 and then in response to an input/output (I/O) operation received from a computational device 126, perform read operations from the tape 110 with the data read head 122 and write operations from the tape 110 with the data write head 124.

Figure 2:
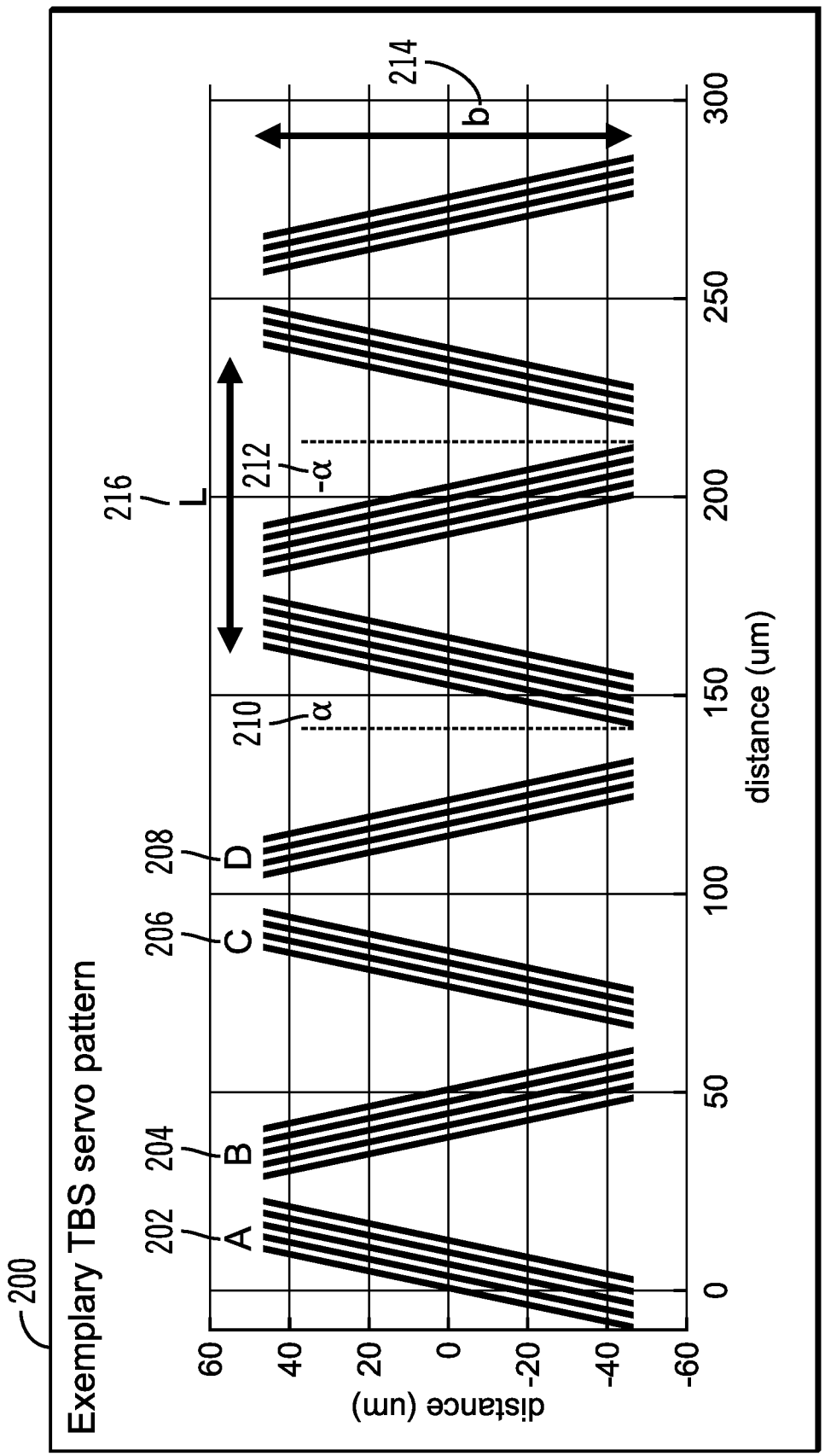
FIG. 2 illustrates a block diagram of an exemplary TBS servo pattern, in accordance with certain embodiments.

FIG. 2 illustrates a block diagram of an exemplary TBS servo pattern 200, in accordance with certain embodiments.

The TBS servo pattern 200 is comprised of groups of stripes written on the magnetic tape 104. The groups of stripes are referred to as A burst, B burst, C burst, and D burst (as shown via reference numerals 202, 204, 206, 208). The TBS servo pattern 200 may be described by the following parameters: azimuth angle α (shown via reference numerals 210, 212), height b 214 and servo subframe length L 216.

The servo patterns are written at an azimuth angle of +α or −α as illustrated via reference numerals 210, 212 (α=12 degrees in certain embodiments). The azimuth angle, α, in conventional TBS is defined as the angle perpendicular to the tape travel direction. As the servo reader reads the servo pattern during tape transport, the servo reader produces a series of dibit pulses in response to each stripe, resulting in bursts of dibit pulses in a repeating 5-5-4-4 pattern where the A burst 202 and the B burst 204 correspond to the 5-5 pattern and where the C burst 206 and the D burst 208 correspond to the 4-4 pattern. Linear tape-open (LTO) format and IBM® Enterprise format specify such 5-5-4-4 patterns but other patterns may be used in alternative embodiments. The relative timing of these dibit pulses are analyzed by a servo channel to produce a series of measurements of the lateral position of the tape relative to the head referred to as YPOS. The skew of the tape relative to the head is measured by comparing the distance travelled between the arrival of a dibit pulse observed with the top servo reader from a given stripe in the servo pattern and the pulse from the corresponding stripe observed with the bottom servo reader, where this technique is referred to as top-bottom skew.

Figure 3:
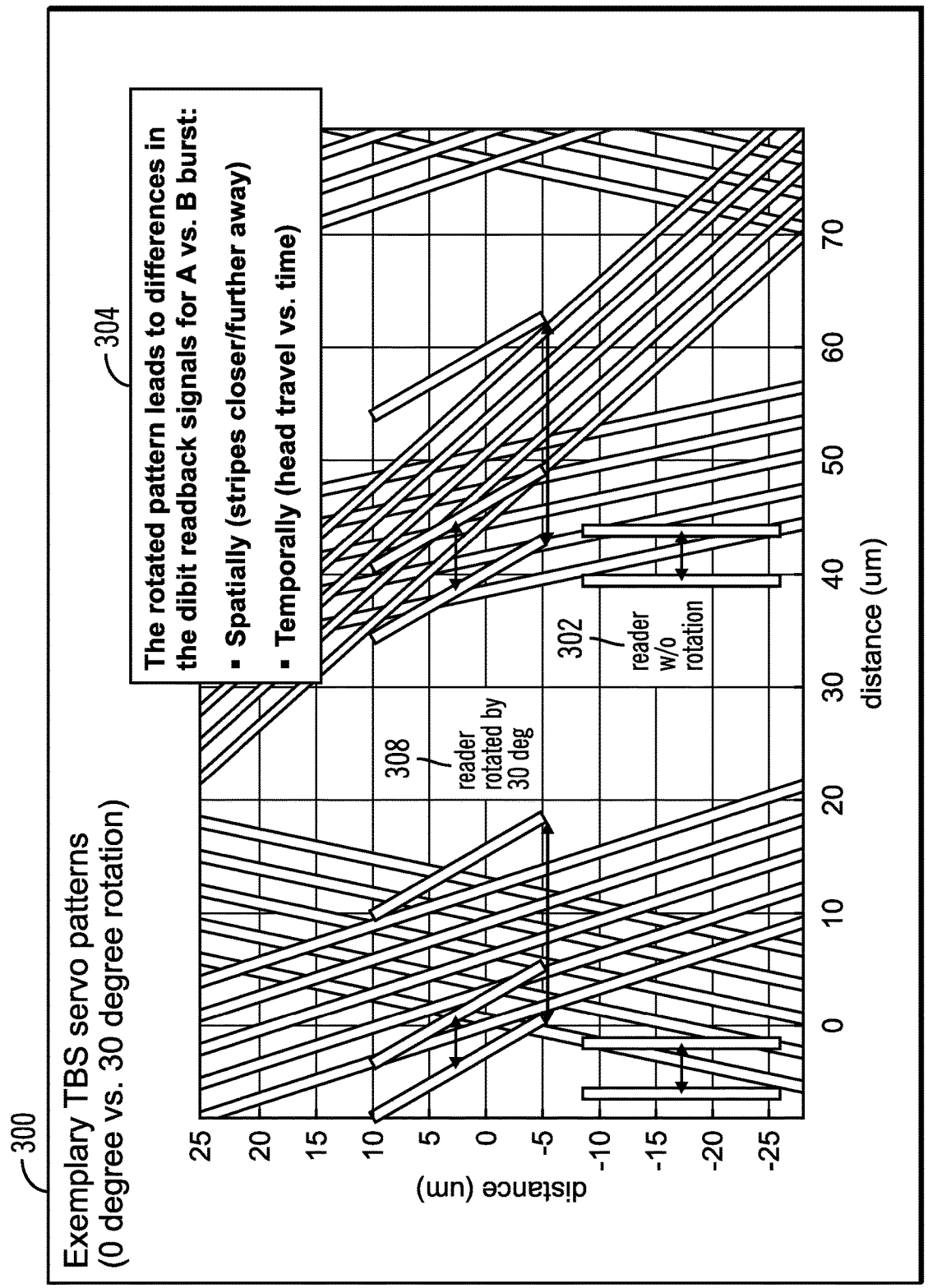
FIG. 3 illustrates a block diagram that shows exemplary TBS servo patterns under 0 degree and 30 degrees of rotation, in accordance with certain embodiments.

FIG. 3 illustrates a block diagram 300 that shows exemplary TBS servo patterns under 0 degree and 30 degrees of rotation, in accordance with certain embodiments. Shown in FIG. 3 are readers without rotation (e.g., reader shown via reference numeral 302) and readers with rotation of 30 degrees (e.g. reader shown via reference numeral 308). The rotated pattern leads to differences in dibit readback signals for A burst vs. B burst (as shown via reference numeral 304) caused by spatial changes where stripes may be closer or further away, and by temporal changes in head travel over time.

Figure 4:
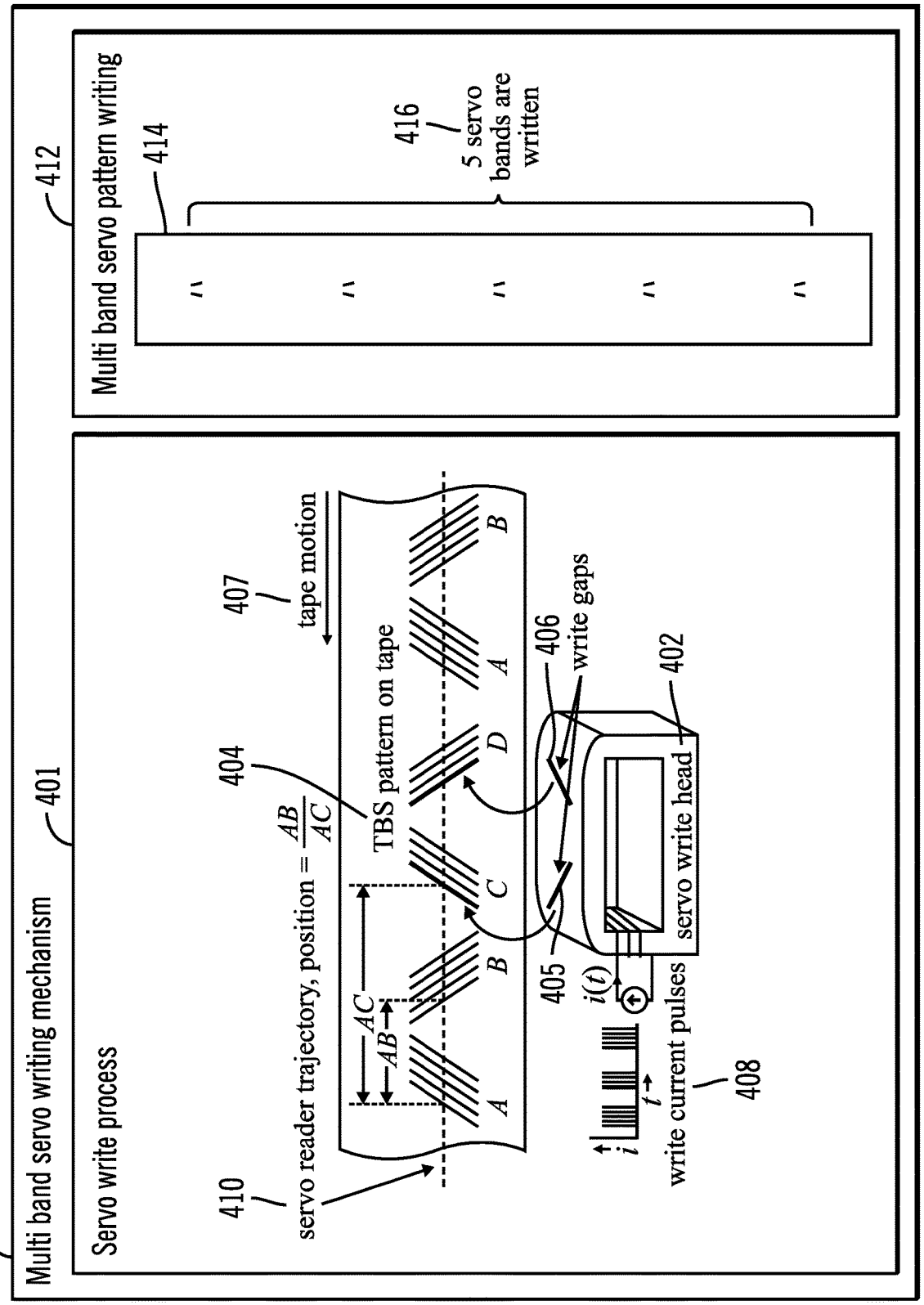
FIG. 4 illustrates a block diagram that shows a multi band servo writing mechanism, in accordance with certain embodiments.

FIG. 4 illustrates a block diagram 400 that shows a multi band servo writing mechanism, in accordance with certain embodiments.

A servo write process 401 is shown in which a servo write head 402 writes TBS patterns 404 on a moving tape with a direction of motion shown via reference numeral 407. The first write gap 405 writes the stripes on the A and C burst and the second write gap 406 writes the stripes in the B and D bursts. Write current pulses 408 trigger the writing of TBS patterns by the write gaps 404, 406. Servo reader trajectory positions may be computed from the distances in the TBS patterns.

FIG. 4 also shows certain embodiments for multi-band servo pattern writing 412 in which a plurality of servo bands are written on the tape with a head 414 that writes 5 servo bands (shown via reference numeral 416).

Figure 5:
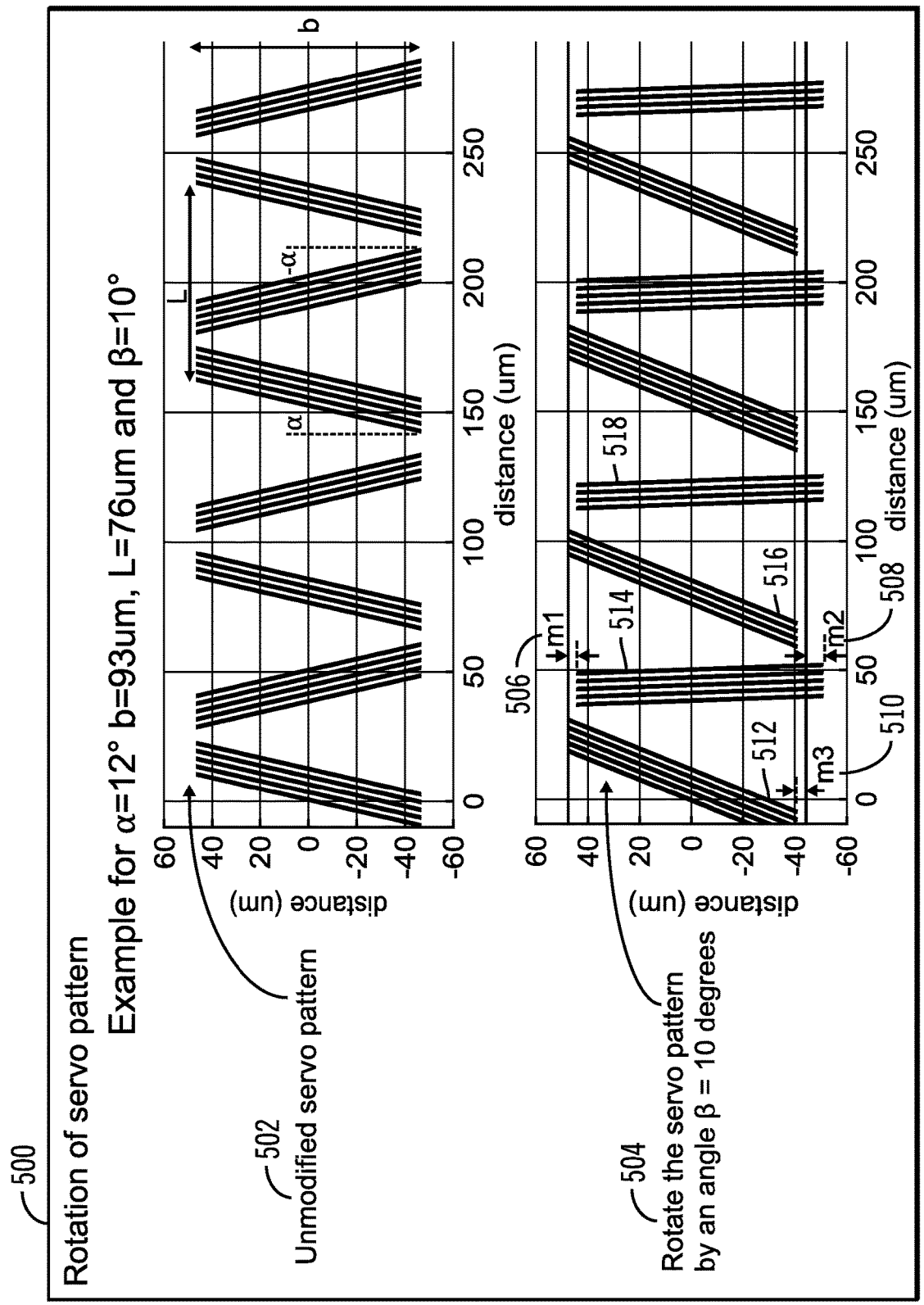
FIG. 5 illustrates a block diagram that shows the rotation of a servo pattern, in accordance with certain embodiments.

FIG. 5 illustrates a block diagram that shows the rotation of a servo pattern, in accordance with certain embodiments.

The unmodified servo pattern is shown via reference numeral 502 in the top servo patterns, and the servo patterns rotated by an angle beta ($\beta$) of 10 degrees is shown via reference numerals 504 in the bottom servo patterns.

On rotation, the displacements of the rotated servo patterns from the unmodified servo patterns are shown by the lengths m1 506, m2 508, m3 510. The top of the servo stripes in the B 514 and D 518 bursts have decreased by the length m1 510. The bottom of the servo stripes in the B 514 and D 518 bursts have increased by the length m2 508. The bottom of the servo stripes in the A 512 and C 516 bursts have decreased by the length m3 510.

Figure 6:
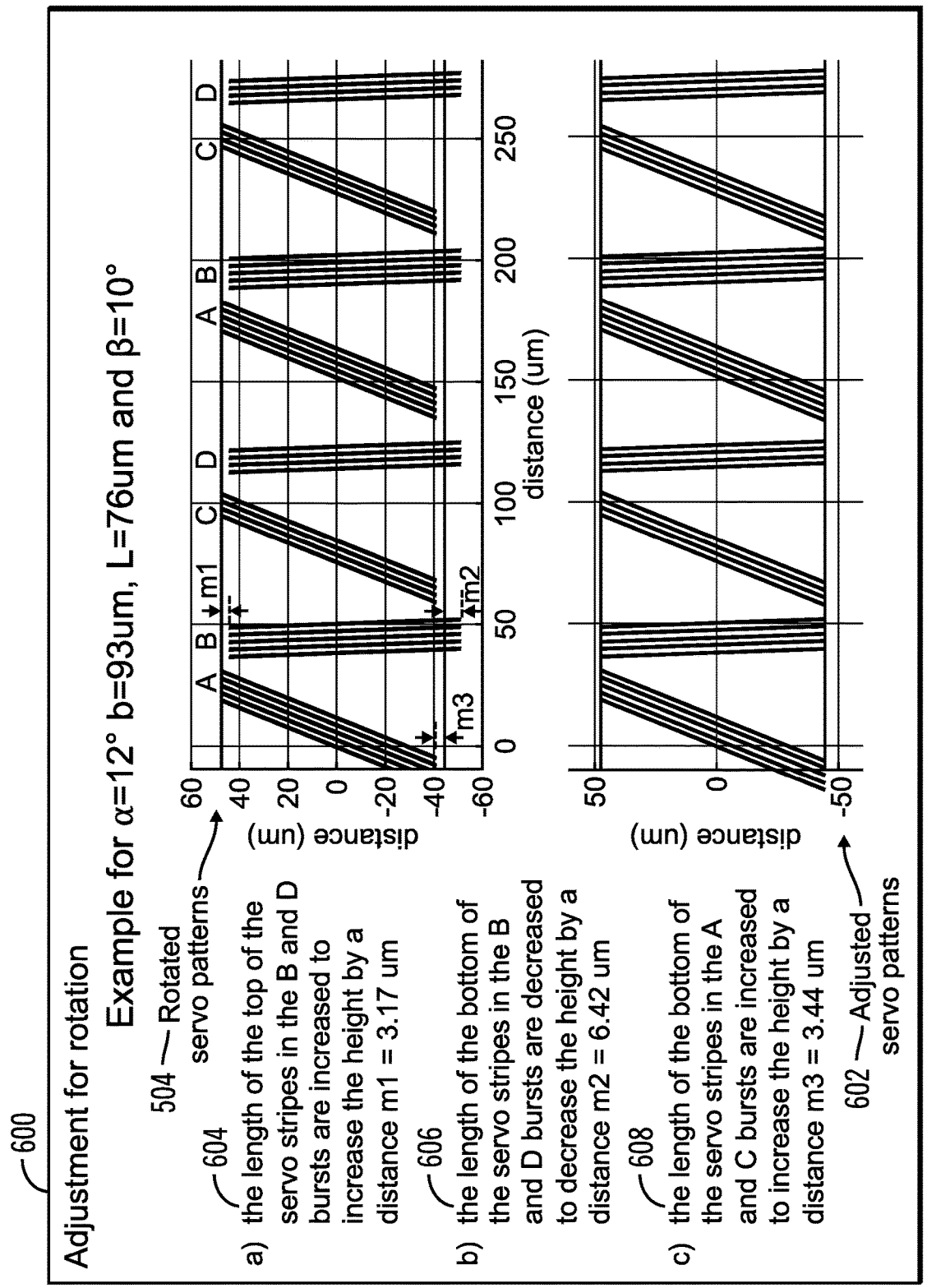
FIG. 6 illustrates a block diagram that shows adjustments made to compensate for the rotation of a servo pattern, in accordance with certain embodiments.

FIG. 6 illustrates a block diagram 600 that shows adjustments made to compensate for the rotation of servo patterns, in accordance with certain embodiments.

The rotated servo pattern 504 from FIG. 5 is shown at the top in FIG. 6. The adjusted servo pattern 602 to compensate of the rotations are generated by performing the following operations:
 (a) The length of the of the top of the servo stripes in the B and D bursts are increased to increase the height by a distance m1; (reference numeral 604)
 (b) The length of the of the bottom of the servo stripes in the B and D bursts are decreased to decrease the height by a distance m2; (reference numeral 606) and
 (c) The length of the of the bottom of the servo stripes in the A and C bursts are increased to increase the height by a distance m3; (reference numeral 608).

As a result of the operations shown in FIG. 6, by expanding and trimming the length of servo stripes, certain effects of rotation are compensated for, and the adjusted servo bands are shown via reference numeral 602.

Figure 7:
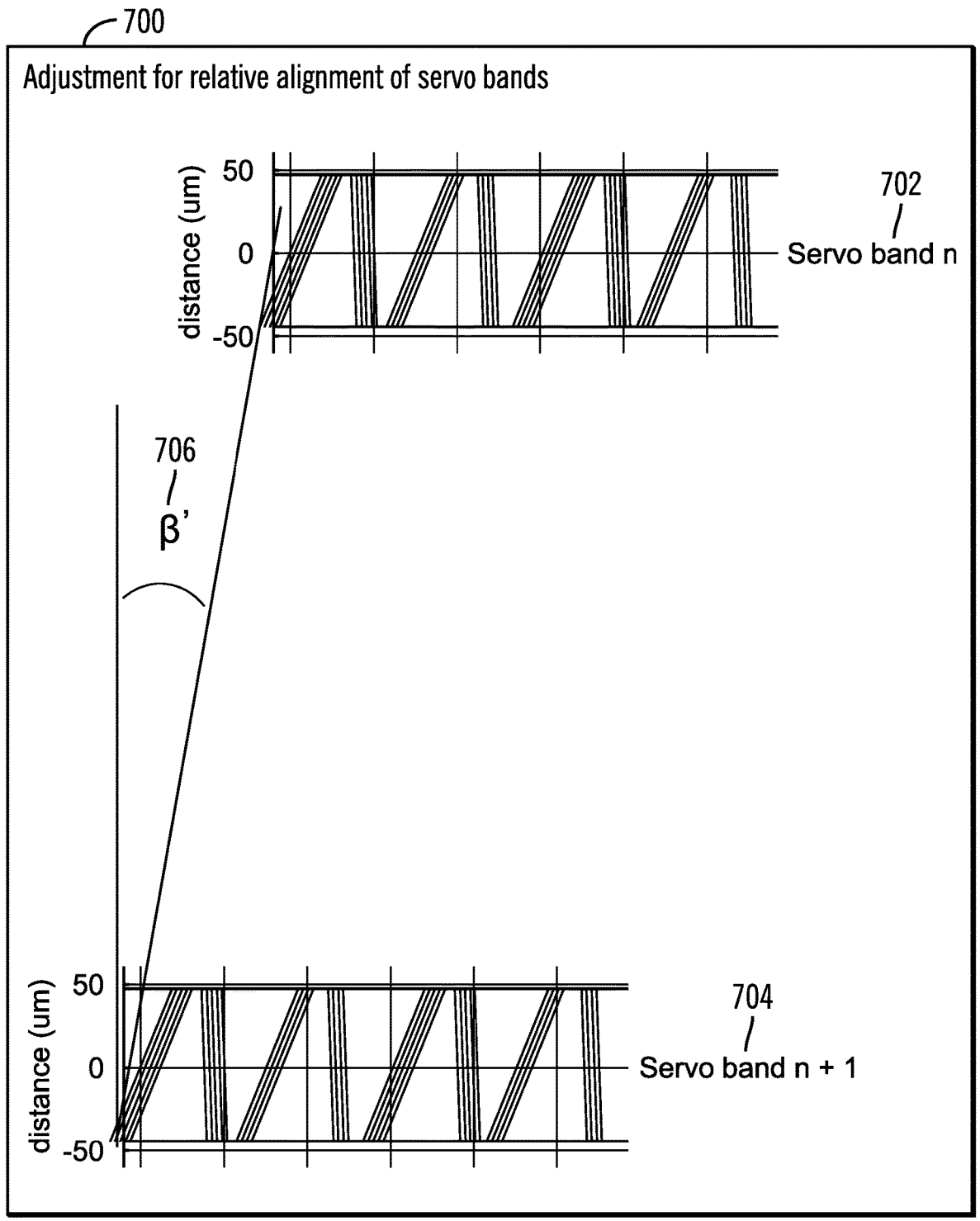
FIG. 7 illustrates a block diagram that shows adjustments made for relative alignment of servo bands, in accordance with certain embodiments.

FIG. 7 illustrates a block diagram that shows adjustments made for relative alignment of servo bands 700, in accordance with certain embodiments. The operations shown in FIG. 7 may be performed by a controller.

In FIG. 7 two successive servo bands on a tape referred to as servo band n 702 and servo band n+1 704 are shown.

For example, if there are two servo bands then servo band n is the top servo band and servo band n+1 is the bottom servo band on the tape. If there are three servo bands from top to bottom on a tape that are referred to as a first, second, and a third servo band, then servo bands n and n+1 may be the first and second servo band respectively, or the second and third servo band respectively.

On rotation, the corresponding servo frames of two consecutive have an angular displacement of $\beta'$ (shown by reference numeral 706) that needs to be adjusted for to compensate for the effects of rotations. The corresponding frames may also be referred to as equivalent frames. In certain embodiments, the angular displacement is compensated for by shifting servo bands.

Figure 8:
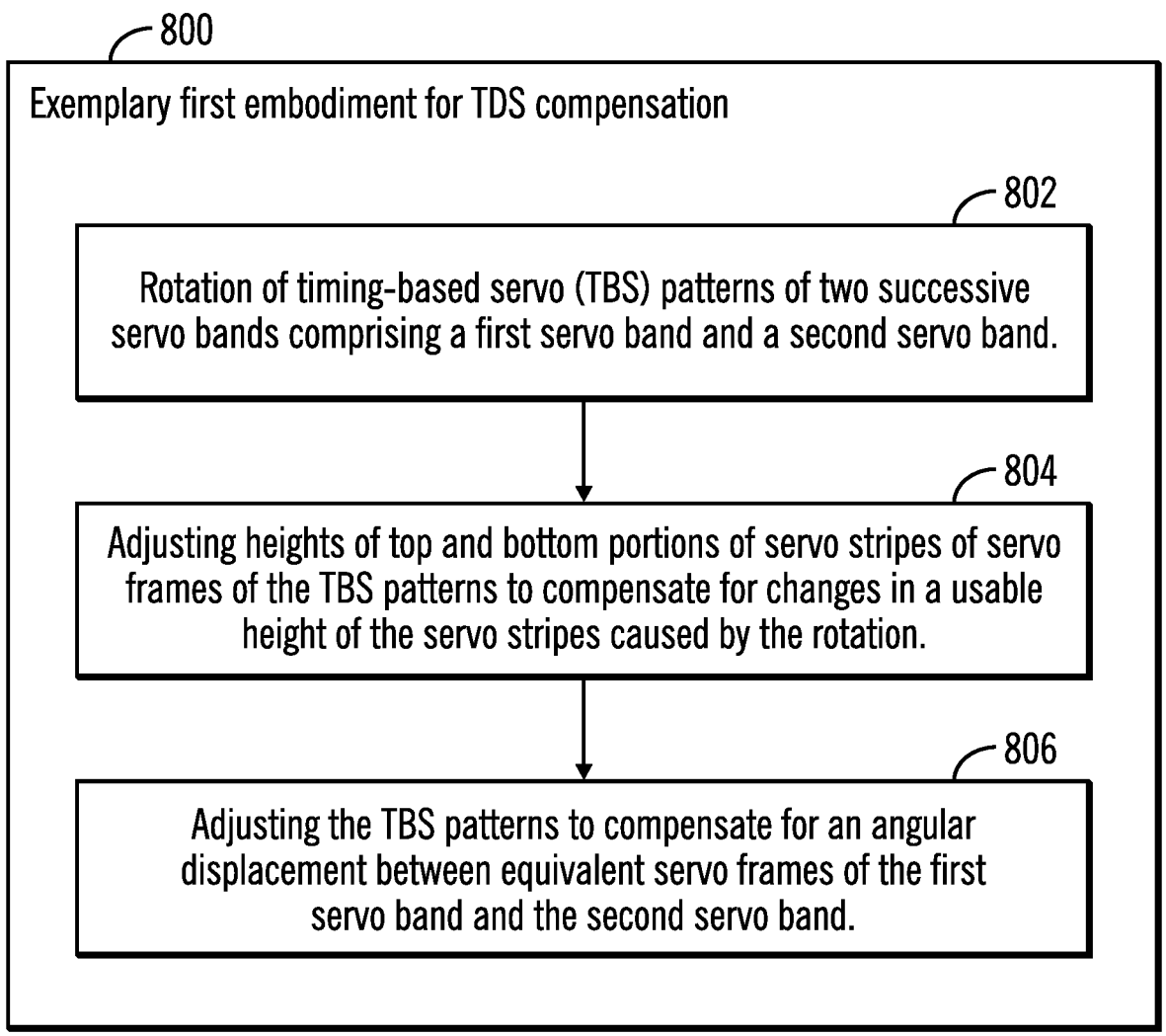
FIG. 8 illustrates a first flow chart that shows the adjusting of TBS servo patterns for use with TDS compensation, in accordance with certain embodiments.

FIG. 8 illustrates a first flow chart that shows the adjusting of TBS servo patterns for use with TDS compensation, in accordance with certain embodiments.

Control starts at block 802, in which rotation of timing-based servo (TBS) patterns of two successive servo bands comprising a first servo band and a second servo band take place. The two successive servo bands may be included in a plurality of servo bands. From block 802 control proceeds to block 804 where in response to the rotation of timing-based servo (TBS) patterns of the two successive servo bands comprising a first servo band and a second servo band, heights of top and bottom portions of servo stripes of servo frames of the TBS patterns are adjusted to compensate for changes in a usable height of the servo stripes caused by the rotation (as shown in FIG. 6).

From block 804 control proceeds to block 806 in which the TBS patterns are adjusted to compensate for an angular displacement between equivalent servo frames of the first servo band and the second servo band (as shown in FIG. 7).

Figure 9:
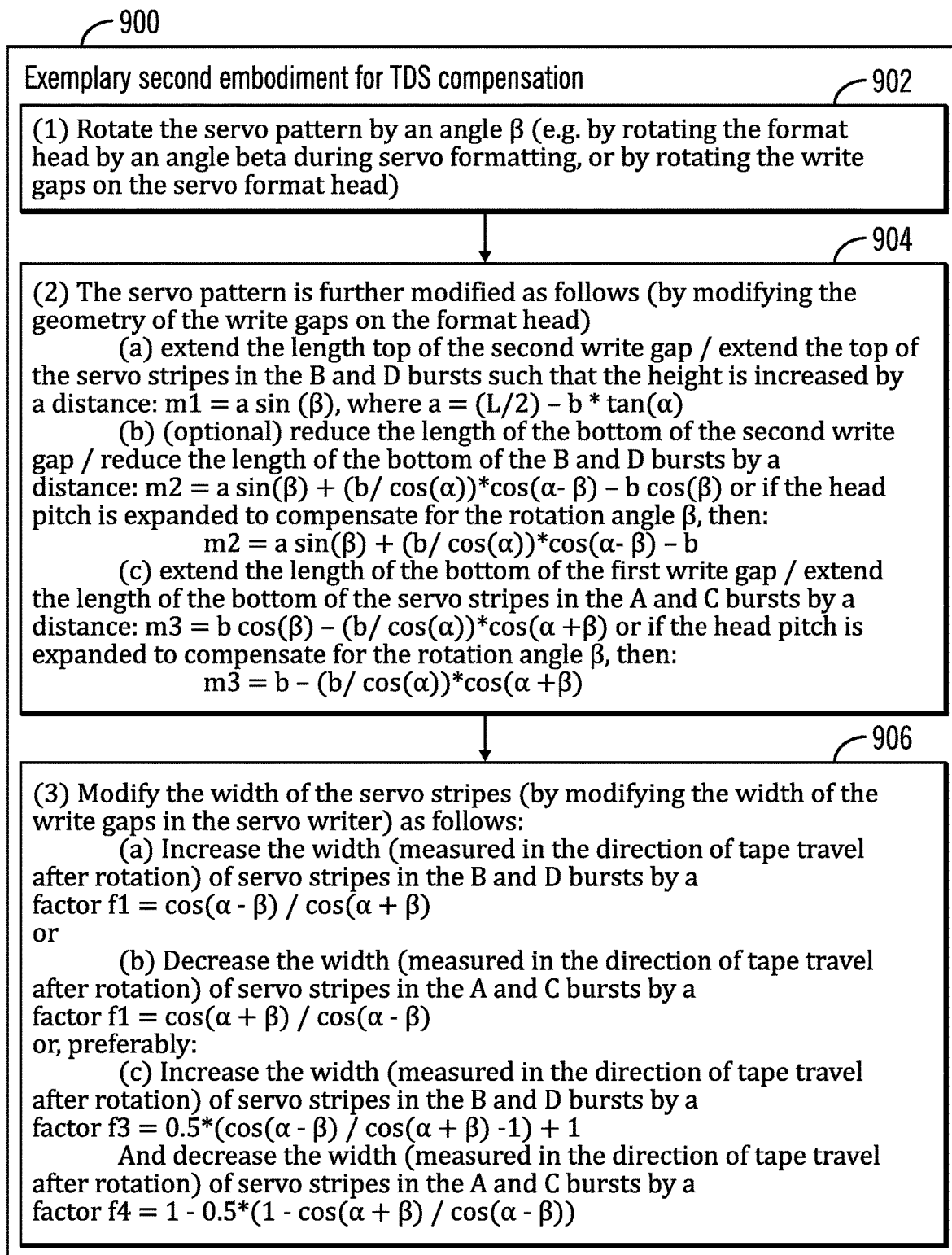
FIG. 9 illustrates a second flow chart that shows the adjusting of TBS servo patterns for use with TDS compensation, in accordance with certain embodiments.

It should be noted that the adjustments made via operations shown in FIG. 8 may be performed by many different embodiments FIG. 9 illustrates a second flow chart that shows the adjusting of TBS servo patterns for use with TDS compensation, in accordance with certain embodiments It should be noted that the operations shown in FIG. 9 are certain embodiments for implementing operations shown in FIG. 8 and alternative embodiments may be used.

In certain embodiments, a TBS pattern is described by the following parameters: azimuth angle $\alpha$, height b and servo subframe length L, to be used in conjunction with a tape drive where the head has a nominal rotation angle of $\beta$ (relative to the direction perpendicular to tape transport in the plane of the tape). Typical values of $\beta$ are in the range of 2 to 17 degrees.

The TBS pattern is modified by operations shown in blocks 902, 904, 906 of FIG. 9 for clockwise rotation. Corresponding modifications may be made in certain embodiments for counterclockwise rotations.

Control starts at block 902 in which a process rotates the servo pattern by an angle $\beta$ (e.g. by rotating the format head by an angle beta during servo formatting, or by rotating the write gaps on the servo format head).

From block 902 control proceeds to block 904 where the following operations are performed:
 The servo pattern is further modified as follows (by modifying the geometry of the write gaps on the format head)
 (a) extend the length top of the second write gap/extend the top of the servo stripes in the B and D bursts such that the height is increased by a distance: $m1=a \sin(\beta)$, where $a=(L/2)-b*\tan(\alpha)$ (b) (optional) reduce the length of the bottom of the second write gap/reduce the length of the bottom of the B and D bursts by a distance: $m2=a \sin(\beta)+(b/\cos(\alpha))*\cos(\alpha-\beta)-b \cos(\beta)$ or if the head pitch is expanded to compensate for the rotation angle $\beta$, then: $m2=a \sin(\beta)+(b/\cos(\alpha))*\cos(\alpha-\beta)-b$ (c) extend the length of the bottom of the first write gap/extend the length of the bottom of the servo stripes in the A and C bursts by a distance: $m3=b \cos(\beta)-(b/\cos(\alpha))*\cos(\alpha+\beta)$ or if the head pitch is expanded to compensate for the rotation angle $\beta$, then: $m3=b-(b/\cos(\alpha))*\cos(\alpha+\beta)$.

(3) Modify the width of the servo stripes (by modifying the width of the write gaps in the servo writer) as follows:
  (a) Increase the width (measured in the direction of tape travel after rotation) of servo stripes in the B and D bursts by a factor $f1=\cos(\alpha-\beta)/\cos(\alpha+\beta)$
  or
  (b) Decrease the width (measured in the direction of tape travel after rotation) of servo stripes in the A and C bursts by a factor $f1=\cos(\alpha+\beta)/\cos(\alpha-\beta)$
  or, preferably:
  (c) Increase the width (measured in the direction of tape travel after rotation) of servo stripes in the B and D bursts by a factor $f3=0.5*(\cos(\alpha-\beta)/\cos(\alpha+\beta)-1)+1$
  And decrease the width (measured in the direction of tape travel after rotation) of servo stripes in the A and C bursts by a factor $f4=1-0.5*(1-\cos(\alpha+\beta)/\cos(\alpha-\beta))$
  For example, for a servo pattern with $\alpha=12°$ and head rotation angle of $\beta=10°$ $f1=1.078$, $f2=0.928$, $f3=1.039$, $f4=0.964$.

From block 904 control proceeds to block 906 in which the following operations are performed:
  Modify the width of the servo stripes (by modifying the width of the write gaps in the servo writer) as follows:
  (a) Increase the width (measured in the direction of tape travel after rotation) of servo stripes in the B and D bursts by a factor $f1=\cos(\alpha-\beta)/\cos(\alpha+\beta)$
  or
  (b) Decrease the width (measured in the direction of tape travel after rotation) of servo stripes in the A and C bursts by a factor $f1=\cos(\alpha+\beta)/\cos(\alpha-\beta)$,
  or preferably:
  (c) Increase the width (measured in the direction of tape travel after rotation) of servo stripes in the B and D bursts by a factor $f3=0.5*(\cos(\alpha-\beta)/\cos(\alpha+\beta)-1)+1$ and decrease the width (measured in the direction of tape travel after rotation) of servo stripes in the A and C bursts by a factor $f4=1-0.5*(1-\cos(\alpha+\beta)/\cos(\alpha-\beta))$
  For example, for a servo pattern with $\alpha=12°$ and head rotation angle of $\beta=10°$ $f1=1.078$, $f2=0.928$, $f3=1.039$, $f4=0.964$.

Therefore, certain embodiments shown in FIGS. 1-9 provide mechanisms for maintaining tape dimensional stability and improves the performance of a tape based storage system by compensating for rotations of TBS patterns. Such embodiments improve the operations of a tape formatting device, and a computer system by providing mechanisms that improve data storage mechanisms such as a tape drive associated with a computer system.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 10:
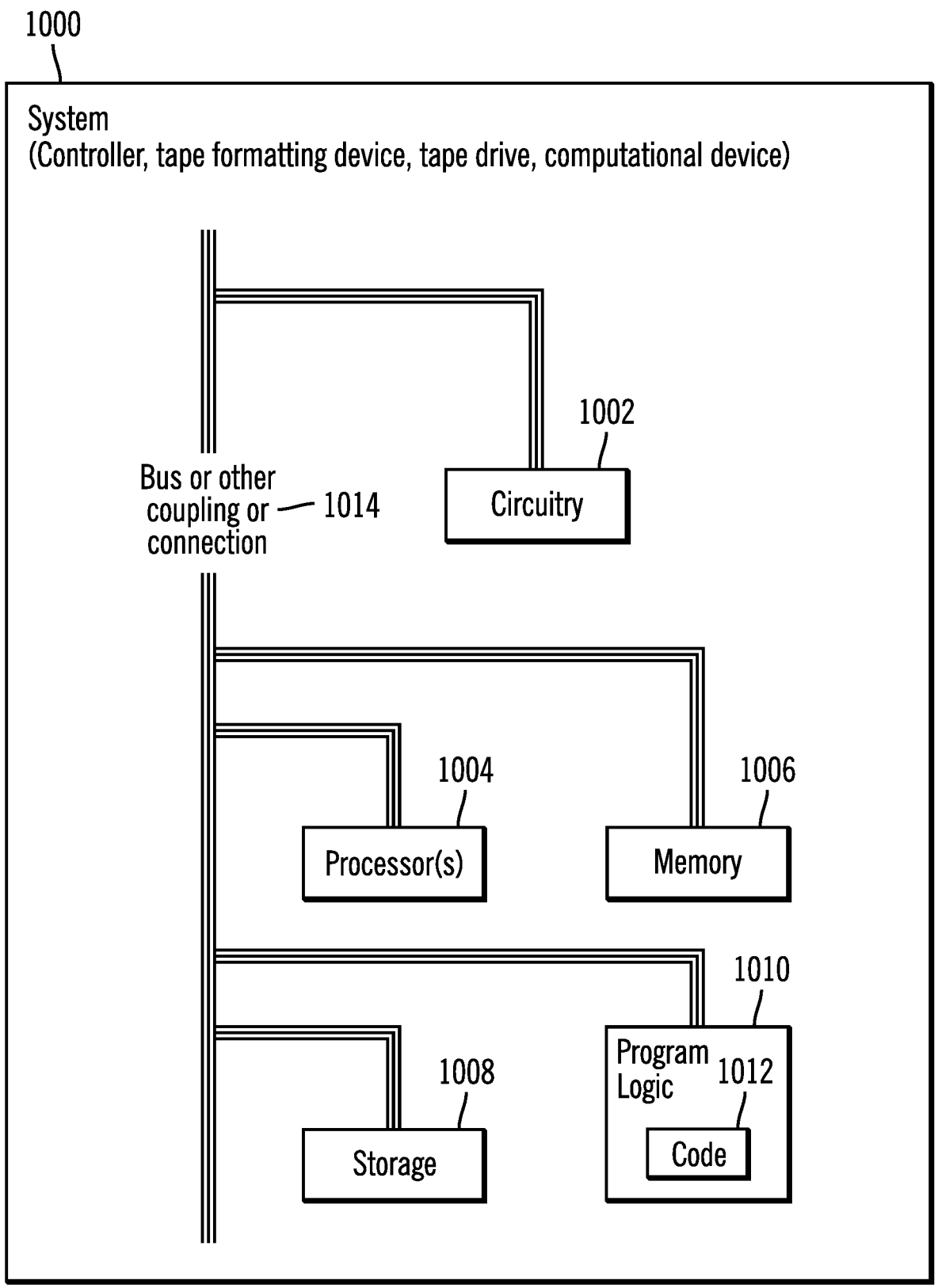
FIG. 10 illustrates a block diagram of a system that shows certain elements that may be included in a controller, a tape formatting device, a tape drive, and a computational device as described in FIGS. 1-9, in accordance with certain embodiments.

FIG. 10 illustrates a block diagram of a system that shows certain elements that may be included in the controller 116, 118, tape formatting device 102, tape drive 106, or a computational device 126 in accordance with certain embodiments. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. Therefore, while FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter the invention, the invention resides in the claims hereinafter appended.

What is claimed is:

1. A method for a magnetic tape system, the method comprising:
   in response to a rotation of timing-based servo (TBS) patterns of a first servo band and a second servo band, adjusting a height of a top portion of servo stripes of at least one of a first pattern and a second pattern that comprise an entirety of a TBS pattern, by a distance that is a function of an azimuth angle and an angle of rotation to compensate for changes in a usable height of the servo stripes caused by the rotation.

2. The method of claim 1, the method further comprising:
   adjusting the TBS patterns to compensate for an angular displacement between equivalent servo frames of the first servo band and the second servo band.

3. The method of claim 2, wherein first servo band and the second servo band are two successive servo bands included in a plurality of servo bands.

4. The method of claim 2, wherein the entirety of the TBS pattern is comprised of:
   the first pattern including servo stripes written on a magnetic tape at an azimuth angle of $+\alpha$; and
   the second pattern including servo stripes written on the magnetic tape at an azimuth angle of $-\alpha$, wherein the entirety of the TBS pattern has an overall TBS pattern height of b and a servo sub-frame length of L, wherein the entirety of the TBS pattern including the first pattern and the second pattern has a rotation angle of $\beta$ relative to the magnetic tape, and wherein $\beta$ ranges from 2 degrees to 17 degrees.

5. The method of claim 4, wherein the height of the top portion of the servo stripes of the second pattern is increased by a distance m1 which is computed as:

$$m1=a\sin(\beta), \text{where } a=(L/2)-b*\tan(\alpha).$$

6. A tape formatting device, the tape formatting device comprising:
   a controller; and
   a servo write head coupled to the controller and configured to write timing-based servo (TBS) patterns on a tape, wherein adjustments to the TBS patterns have been made during manufacturing of the servo write head via operations comprising:
      in response to a rotation of the TBS patterns of a first servo band and a second servo band, adjusting a height of a top portion of servo stripes of at least one of a first pattern and a second pattern that comprise an entirety of a TBS pattern, by a distance that is a function of an azimuth angle and an angle of rotation to compensate for changes in a usable height of the servo stripes caused by the rotation.

7. The tape formatting device of claim 6, wherein the TBS patterns have been adjusted during the manufacturing of the servo write head via additional operations comprising:
   adjusting the TBS patterns to compensate for an angular displacement between equivalent servo frames of the first servo band and the second servo band.

8. The tape formatting device of claim 7, wherein first servo band and the second servo band are two successive servo bands included in a plurality of servo bands.

9. The tape formatting device of claim 7, wherein the entirety of the TBS pattern is comprised of:
   the first pattern including servo stripes written on a magnetic tape at an azimuth angle of $+\alpha$; and
   the second pattern including servo stripes written on the magnetic tape at an azimuth angle of $-\alpha$, wherein the entirety of the TBS pattern has an overall TBS pattern height of b and a servo sub-frame length of L, wherein the entirety of the TBS pattern including the first pattern and the second pattern has a rotation angle of $\beta$ relative to the magnetic tape, and wherein $\beta$ ranges from 2 degrees to 17 degrees.

10. The tape formatting device of claim 9, wherein the height of the top portion of the servo stripes of the second pattern is increased by a distance m1 which is computed as:

$$m1=a\sin(B), \text{where } a=(L/2)-b*\tan(\alpha).$$

11. A computer program product, the computer program product comprising a computer readable storage medium having computer readable program code embodied therewith, the computer readable program code configured to perform operations in a device, the operations comprising:
   in response to a rotation of timing-based servo (TBS) patterns of a first servo band and a second servo band, adjusting a height of a top portion of servo stripes of at least one of a first pattern and a second pattern that comprise an entirety of a TBS pattern, by a distance that is a function of an azimuth angle and an angle of rotation to compensate for changes in a usable height of the servo stripes caused by the rotation.

12. The computer program product of claim 11, the operations further comprising:
   adjusting the TBS patterns to compensate for an angular displacement between equivalent servo frames of the first servo band and the second servo band.

13. The computer program product of claim 12, wherein first servo band and the second servo band are two successive servo bands included in a plurality of servo bands.

14. The computer program product of claim 12, wherein the entirety of the TBS pattern is comprised of:
- the first pattern including servo stripes written on a magnetic tape at an azimuth angle of +α; and
- the second pattern including servo stripes written on the magnetic tape at an azimuth angle of −α, wherein the entirety of the TBS pattern has an overall TBS pattern height of b and a servo sub-frame length of L, wherein the entirety of the TBS pattern including the first pattern and the second pattern has a rotation angle of β relative to the magnetic tape, and wherein β ranges from 2 degrees to 17 degrees.

15. The computer program product of claim 14, wherein the height of the top portion of the servo stripes of the second pattern is increased by a distance m1 which is computed as:

$$m1 = a\sin(\beta), \text{ where } a = (L/2) - b*\tan(\alpha).$$

16. A method of manufacturing a tape, the method of manufacturing comprising:
- in response to a rotation of timing-based servo (TBS) patterns of a first servo band and a second servo band, adjusting a height of a top portion of servo stripes of at least one of a first pattern and a second pattern that comprise an entirety of a TBS pattern, by a distance that is a function of an azimuth angle and an angle of rotation to compensate for changes in a usable height of the servo stripes caused by the rotation.

17. The method of manufacturing of claim 16, the method of manufacturing further comprising:
- adjusting the TBS patterns to compensate for an angular displacement between equivalent servo frames of the first servo band and the second servo band.

18. The method of manufacturing of claim 17, wherein first servo band and the second servo band are two successive servo bands included in a plurality of servo bands.

19. The method of manufacturing of claim 17, wherein the entirety of the TBS pattern is comprised of:
- the first pattern including servo stripes written on a magnetic tape at an azimuth angle of +α; and
- the second pattern including servo stripes written on the magnetic tape at an azimuth angle of −α, wherein the entirety of the TBS pattern has an overall TBS pattern height of b and a servo sub-frame length of L, wherein the entirety of the TBS pattern including the first pattern and the second pattern has a rotation angle of β relative to the magnetic tape, and wherein β ranges from 2 degrees to 17 degrees.

20. The method of manufacturing of claim 19, wherein the height of the top portion of the servo stripes of the second pattern is increased by a distance m1 which is computed as:

$$m1 = a\sin(\beta), \text{ where } a = (L/2) - b*\tan(\alpha).$$

21. A method for a servo write head, the method comprising:
- configuring the servo write head to write timing-based servo (TBS) patterns on a tape, wherein adjustments to the TBS patterns have been made during manufacturing of the servo write head via operations comprising:
  - in response to a rotation of the TBS patterns of a first servo band and a second servo band, adjusting a height of a top portion of servo stripes of at least one of a first pattern and a second pattern that comprise an entirety of a TBS pattern, by a distance that is a function of an azimuth angle and an angle of rotation to compensate for changes in a usable height of the servo stripes caused by the rotation.

22. The method of claim 21, the method further comprising:
- adjusting the TBS patterns to compensate for an angular displacement between equivalent servo frames of the first servo band and the second servo band.

23. The method of claim 22, wherein first servo band and the second servo band are two successive servo bands included in a plurality of servo bands.

24. The method of claim 22, wherein the entirety of the TBS pattern is comprised of:
- the first pattern including servo stripes written on a magnetic tape at an azimuth angle of +α; and
- the second pattern including servo stripes written on the magnetic tape at an azimuth angle of −α, wherein the entirety of the TBS pattern has an overall TBS pattern height of b and a servo sub-frame length of L, wherein the entirety of the TBS pattern including the first pattern and the second pattern has a rotation angle of β relative to the magnetic tape, and wherein β ranges from 2 degrees to 17 degrees.

25. The method of claim 24, wherein the height of the top portion of the servo stripes of the second pattern is increased by a distance m1 which is computed as:

$$m1 = a\sin(\beta), \text{ where } a = (L/2) - b*\tan(\alpha).$$

* * * * *